United States Patent [19]

Murakami

[11] Patent Number: 5,174,422
[45] Date of Patent: Dec. 29, 1992

[54] TRANSMISSION EQUIPPED WITH TORQUE CONVERTER

[75] Inventor: Isao Murakami, Neyagawa, Japan

[73] Assignee: Kabushiki Kaisha Daikin Seisankusho, Osaka, Japan

[21] Appl. No.: 783,749

[22] Filed: Oct. 28, 1991

[30] Foreign Application Priority Data

Oct. 30, 1990 [JP] Japan .................. 114347[U]

[51] Int. Cl.⁵ .......................................... F16D 25/11
[52] U.S. Cl. .................... 192/3.27; 192/3.33; 192/87.13; 192/87.19; 192/109 F; 74/730.1; 137/625.37; 91/31
[58] Field of Search ................. 74/730.1; 192/87.13, 192/87.14, 87.15, 87.18, 87.19, 3.25, 3.27, 3.33, 109 F; 137/625.37, 625.38; 91/31, 32

[56] References Cited

U.S. PATENT DOCUMENTS

| | | | |
|---|---|---|---|
| 3,466,950 | 9/1969 | Mummert | 137/625.37 |
| 4,126,059 | 11/1978 | Smemo | 74/730.1 X |
| 4,227,602 | 10/1980 | Ideta et al. | 192/109 F |
| 4,502,577 | 3/1985 | Nakamichi | 192/109 F |

FOREIGN PATENT DOCUMENTS

| | | | |
|---|---|---|---|
| 553252 | 12/1956 | Belgium | 192/109 F |
| 2604608 | 8/1977 | Fed. Rep. of Germany | 192/109 F |
| 3738794 | 5/1989 | Fed. Rep. of Germany | 74/730.1 |
| 58-109726 | 6/1983 | Japan | 192/109 F |
| 1235273 | 6/1971 | United Kingdom | 192/109 F |

Primary Examiner—Leslie A. Braun
Assistant Examiner—William O. Trousdell
Attorney, Agent, or Firm—Armstrong & Kubovcik

[57] ABSTRACT

A transmission equipped with torque converter having a forward/backward change valve for supplying working oil selectively to any one of a forward clutch or a backward clutch. A shock diverter valve is installed between the forward/backward change valve and a working oil supply source. The shock diverter valve is so designed as to include plural throttles having different bore diameters through which working oil is passed to reduce a rise speed of downsteam side hydraulic pressure. A lever for changing the shock diverter valve is installed at an outside of clutch. An operator can select a drive feeling easily from at least two kinds of feeling by operating a lever.

1 Claim, 2 Drawing Sheets

TRANSMISSION EQUIPPED WITH TORQUE CONVERTER

DESCRIPTION

2. Background of the Invention
(Industrial useful field)

This invention relates to a transmission equipped with torque converter including a shock diverter valve for moderating a shock produced when changing a drive mode forward or backward (changing a drive speed).

(Prior art and its problem)

In vehicles such as a fork lift etc. having a transmission equipped with torque converter, a requirement for drive feeling at time of changing a drive mode forward or backward differs depending on an intended use and a driver's way of feeling. The drive feeling is influenced by clutch pressure rise characteristics of forward and backward clutches.

However, a conventional clutch has had such a structure as including only one kind of clutch pressure rise characteristic, so that the drive feeling at time of changing the drive mode forward or backward has been constant and unable to be changed.

3. Object of the invention

It is an object of this invention to provide a transmission equipped with torque converter, in which a drive feeling at time of changing a drive mode forward or backward can be selected from at least two kinds of feeling, and a driver can select the drive feeling easily by operating a lever.

SUMMARY OF THE INVENTION

According to the present invention, there is provided a transmission equipped with torque converter having a forward/backward change valve for supplying working oil selectively to any one of a forward clutch or a backward clutch, characterized by that a shock diverter valve is installed between the forward/backward change valve and a working oil supply source, the shock diverter valve being so designed as to include plural throttles having different bore diameters through which working oil is passed to reduce a rise speed of downstream side hydraulic pressure, and a lever for changing the shock diverter valve is installed outside.

In the present invention, a pressure of working oil becomes large and a rise speed of it also becomes high when it passes through a throttle with large diameter as compared with when it passes through a throttle with small diameter.

DETAILED DESCRIPTION

Figure 1:
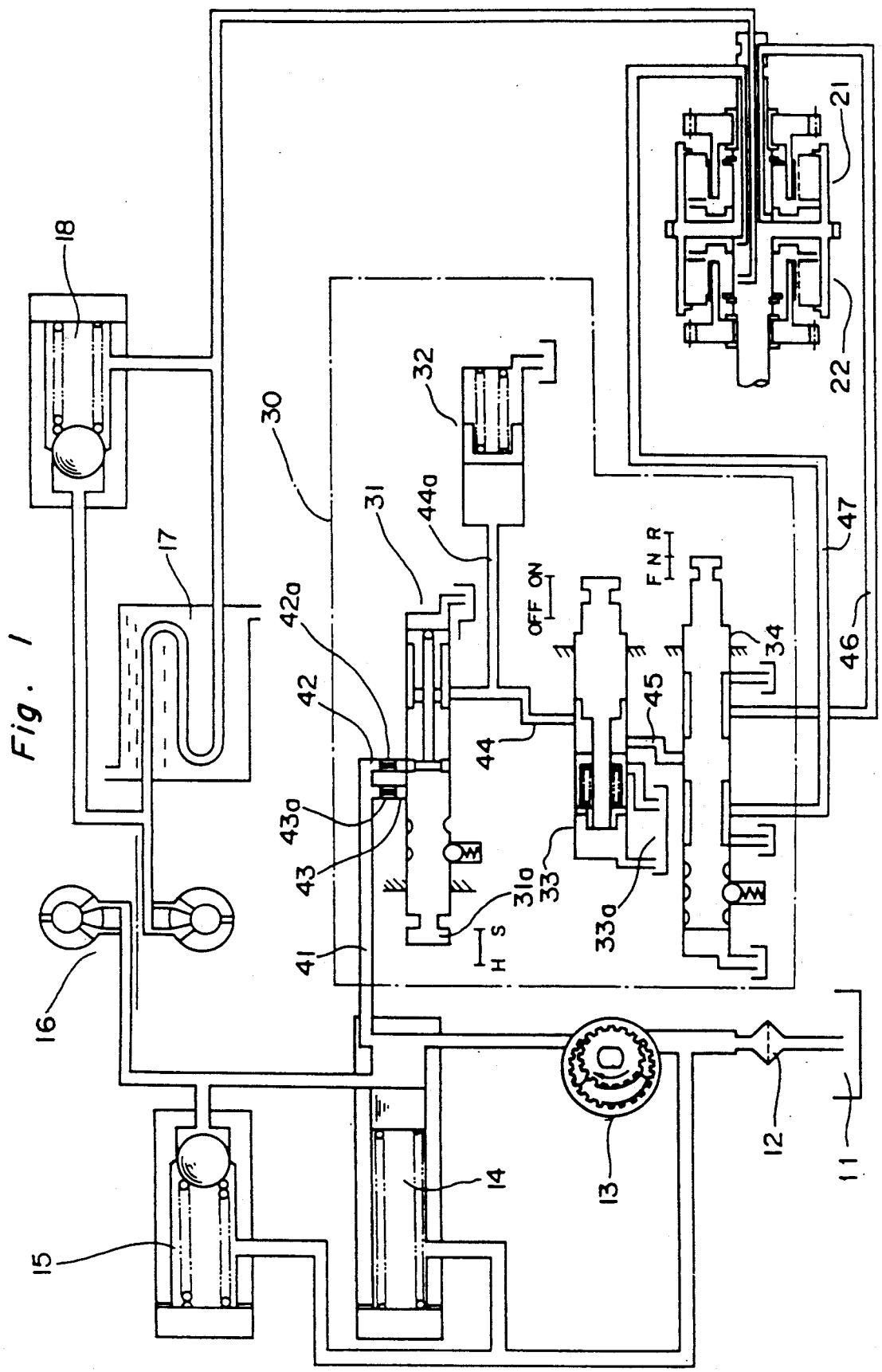
FIG. 1 is a schematic block diagram showing a transmission equipped with torque converter.
Figure 2:
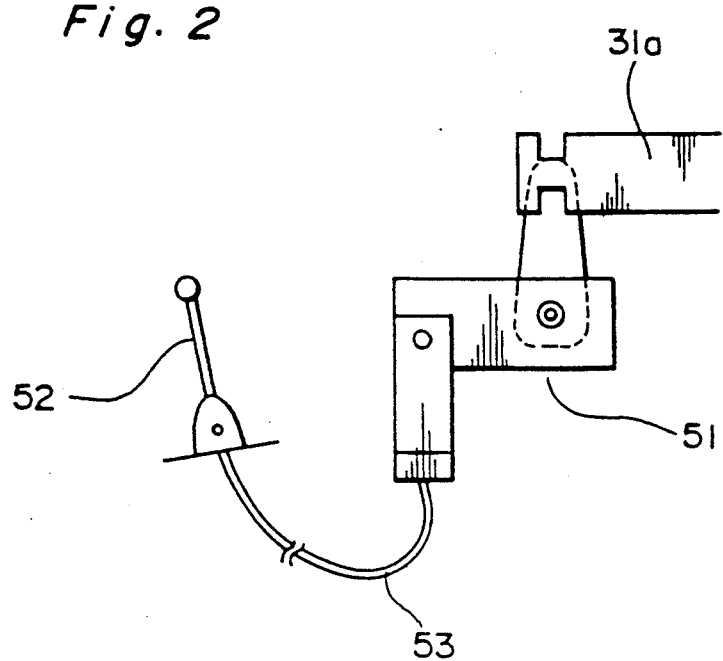
FIG. 2 is a schematic block diagram showing a lever portion of the embodiment of FIG. 1.

The present invention will be described hereunder with reference to the attached drawings. FIG. 1 is the schematic block diagram showing the transmission equipped with torque converter. In FIG. 1, 30 surrounded by a dashed line denotes a hydraulic control circuit for transmission, 11 denotes an oil tank for transmission, 12 denotes a filter and 13 denotes a gear pump. Working oil pumped up by the gear pump 13 from the oil tank 11 is supplied through a main pressure regulator valve 14 to the hydraulic control circuit 30, and is also supplied through the main pressure regulator valve 14 and an inlet relief valve 15 etc. to a torque converter 16. The main pressure regulator valve 14 is one for setting a pressure of the working oil to a specified value. 17 denotes an oil cooler, and 18 denotes a cooler relief valve.

While, a forward clutch 21 and a backward clutch 22 are designed to be changed and controlled by the hydraulic control circuit 30. The hydraulic control circuit 30 includes a shock diverter valve 31, an accumulator 32, an inching valve 33 and a forward/backward change valve 34. The shock diverter valve 31 is connected to the inching valve 33 through a piping 44, and is further connected to the accumulator 32 through a branch pipe 44a branched from the piping 44. The inching valve 33 is connected to the forward/backward change valve 34 through a piping 45. The forward/backward change valve 34 is connected to the forward clutch 21 through a piping 46, and is connected to the backward clutch 22 through a piping 47. The accumulator 32 operates to accumulate a hydraulic pressure transmitted from the shock diverter valve 31 to the inching valve 33. The inching valve 33 is designed to shut off the working oil supplied to the forward/backward change valve 34. 33a denotes a drain.

In the present invention, a piping 41 connecting the main pressure regulator valve 14 to the shock diverter valve 31 is branched in parallel at downstream side to be connected to the shock diverter valve 31, and branch pipes 42 and 43 are provided with throttles 42a and 43a. The throttle 42a has a bore diameter smaller than that of the throttle 43a. A link 51, 51 is coupled to one end of a rod 31a of the shock diverter valve 31. The link 51 is interconnected to a lever 52 through a wire 53. The shock diverter valve 31 is designed to be changed by operating the lever 52 between two modes: one connecting the branch pipe 42 to the piping 44, and the other connecting the branch pipe 43 to the piping 44. The lever 52 is installed at outside of the transmission where an operator can operate the lever.

Figure 3:
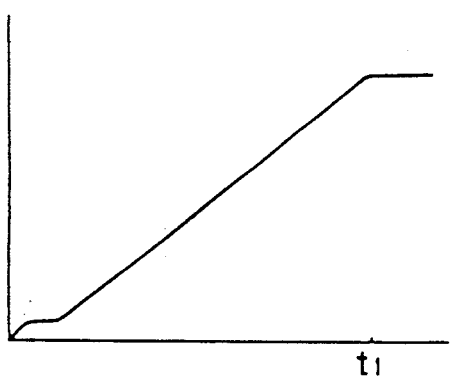
FIG. 3 and FIG. 4 are diagrams showing clutch pressure rise characteristics of the embodiment of FIG. 1.
Figure 4:
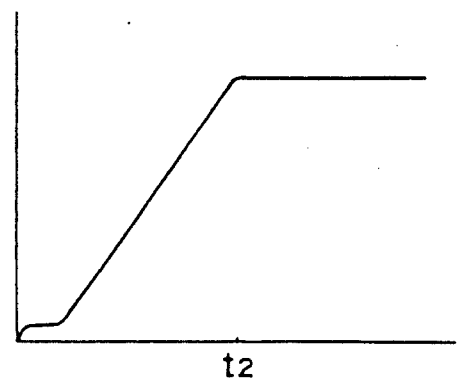

Function will be described hereunder. Under the state of FIG. 1, the shock diverter valve 31 is so changed as to interconnect the piping 42 to the piping 44. Namely, the main pressure regulator valve 14 is interconnected to the piping 44 through the throttle 42a having the small bore diameter. A hydraulic pressure passing through the shock diverter valve 31 is transmitted to the inching valve 33 while being accumulated in the accumulator 32. In the figure, the inching valve 33 is in a continuity state and the forward/backward change valve 34 is in a neutral state, so that the transmitted hydraulic pressure is stopped at the forward/backward change valve 34. When the forward/backward change valve 34 is changed into continuity with the forward side piping 46, hydraulic pressure is transmitted through the piping 46 to the forward clutch 21 to raise the clutch pressure. This pressure rise is caused by a hydraulic pressure passing through the throttle 42a having small bore diameter. On the other hand, the shock diverter valve 31 is changed by operating the lever 52 to put the piping 43 into continuity with the piping 44 when the forward/backward change valve 34 is in a neutral state, and the forward/backward change valve 34 is then changed to be into continuity with the forward side piping 46, the hydraulic pressure is transmitted to the forward clutch 21 through the throttle 43*a* having large bore diameter so that the clutch pressure is raised. This pressure rise is caused by the hydraulic pressure passing through the throttle 43*a* having large bore diameter. FIG. 3 and FIG. 4 show the manners in which the clutch pressure is raised by the hydraulic pressure passing through the throttles 42*a* and 43*a*. A time t1 is longer than a time t2 in the figures, i.e. a pressure rise time becomes long to produce a small and smooth shock in forward and backward changings when the hydraulic pressure passes through the throttle 42*a* (soft mode). The pressure rise time becomes short to produce some shock but the forward and backward changings can be done more quickly (hard mode) when it passes through the throttle 43*a*.

In case when a smooth feeling with small shock is to be obtained at the time of forward/backward changing, it is preferable to select the throttle 42*a* of the shock diverter valve 31 by operating the lever 52. In case when a quick feeling with some shock is to be obtained, it is preferable to select the throttle 43*a* of the shock diverter valve 31 by operating the lever 52. Thus, a desired feeling of change (speed change) can be obtained. Further, since the lever 52 is installed at the outside of the transmission where an operator can operate it, the shock diverter valve 31 can be changed easily by an operator's hand during driving a vehicle.

Two kinds of throttles are included in the above embodiment, however, also three kinds may be used.

As described above, according to the present invention, there is provided the transmission with torque converter having the forward/backward change valve 34 for supplying working oil selectively to any one of the forward clutch 21 or backward clutch 22, characterized by that the shock diverter valve 31 is installed between the forward/backward change valve 34 and the working oil supply source, the shock diverter valve 31 being so designed as to include plural throttles 42*a* and 43*a* having different bore diameters through which the working oil is passed to reduce the rise speed of downstream side hydraulic pressure, and the lever 52 for changing the shock diverter valve 31 is installed outside. Therefore, the smooth feeling with small shock (soft mode) can be obtained at the time of forward-/backward changing when the shock diverter valve 31 is sifted to the throttle 42*a* side. A quick feeling with some shock (hard mode) can be obtained when the shock diverter valve 31 is shifted to the throttle 43*a* side. Thus, a desired feeling of change (speed change) can be obtained. Further, since the lever 52 is installed at the outside of the transmission where an operator can operate it, the shock diverter valve 31 can be changed easily by an operator's hand during driving a vehicle.

What is claimed is:

1. A transmission equipped with a torque converter having a forward clutch and a backward clutch, a forward/backward change valve for selectively supplying working oil from a working oil supply source to one of said forward and backward clutches characterized by that a shock diverter valve is installed between said forward/backward change valve and said working oil supply, said shock diverter valve having plural throttles each with a different bore diameter through which working oil is passed for changing, at the downstream side of said shock diverter valve, hydraulic pressure, and a lever outside of said transmission for operation by an operator and connected to said shock diverter valve in said transmission for selectively supplying working oil to one of said forward and backward clutches at a changed hydraulic pressure at said downstream side of said shock diverter valve as said forward and backward clutches are engaged.

* * * * *

UNITED STATES PATENT AND TRADEMARK OFFICE
CERTIFICATE OF CORRECTION

PATENT NO. : 5,174,422
DATED : December 29, 1992
INVENTOR(S) : Murakami

It is certified that error appears in the above-indentified patent and that said Letters Patent is hereby corrected as shown below:

On the title page, Item [30], the Japanese application number is incorrectly listed as "114347"; it should read --2-114347--.

Signed and Sealed this

Eighteenth Day of January, 1994

Attest:

BRUCE LEHMAN

Attesting Officer       *Commissioner of Patents and Trademarks*